(12) United States Patent
Li et al.

(10) Patent No.: US 8,781,625 B2
(45) Date of Patent: Jul. 15, 2014

(54) CONTROL COMPUTER AND METHOD OF CONTROLLING ROBOTIC ARM

(75) Inventors: Shen-Chun Li, New Taipei (TW); Hsien-Chuan Liang, New Taipei (TW); Shou-Kuo Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 454 days.

(21) Appl. No.: 13/211,324

(22) Filed: Aug. 17, 2011

(65) Prior Publication Data
US 2012/0185097 A1    Jul. 19, 2012

(30) Foreign Application Priority Data
Jan. 13, 2011  (TW) .............................. 100101292 A

(51) Int. Cl.
    *B25J 9/10*   (2006.01)
(52) U.S. Cl.
    USPC .............................. 700/249; 700/247; 901/44
(58) Field of Classification Search
    USPC ......... 700/244, 246, 247, 249, 251, 258, 259; 901/2, 8, 44, 47
    See application file for complete search history.

(56) References Cited

U.S. PATENT DOCUMENTS

| | | | | |
|---|---|---|---|---|
| 5,848,705 A | * | 12/1998 | Gianpaolo et al. | 209/571 |
| 2004/0068347 A1 | * | 4/2004 | Aalund et al. | 700/245 |
| 2005/0265814 A1 | * | 12/2005 | Coady | 414/744.5 |
| 2008/0316504 A1 | * | 12/2008 | Nemets et al. | 356/614 |
| 2012/0026510 A1 | * | 2/2012 | Crampton et al. | 356/601 |

* cited by examiner

*Primary Examiner* — Jason Holloway
(74) *Attorney, Agent, or Firm* — Novak Druce Connolly Bove + Quigg LLP

(57) ABSTRACT

A computer determines a first origin of a first coordinate system of a PCB, and controls a robotic arm to position a probe above the first origin. Furthermore, the computer determines a second origin of a second coordinate system of the robotic arm, and determines displacement values from the first origin to a test point in controlling movements of the robotic arm in the second coordinate system. A graph representing the test point is recognized in an image of the PCB, pixel value differences between the graph center and the image center are determined and converted to displacement correction values for controlling the movements of the robotic arm and determining 3D coordinates of the test point. The robotic arm is moved along a Z-axis of the second coordinate system to precisely position the probe on the test point of the PCB.

20 Claims, 5 Drawing Sheets

CONTROL COMPUTER AND METHOD OF CONTROLLING ROBOTIC ARM

BACKGROUND

1. Technical Field

The present disclosure relates to automatic measurement technology, and particularly to a control computer and a method of controlling a robotic arm.

2. Description of Related Art

In printed circuit board (PCB) inspection, robotic arms are commonly used to automatically position test tools (e.g., probes) on test points of PCBs based on coordinate information recorded in layout files of the PCBs. In such a test manner, the test points are regarded as pure points having no size, and the coordinate information recorded in the layout files arise from linear coordinates systems of the PCBs. However, the robotic arms are driven by motors and therefore the movements of the robotic arms are non-linear. On another hand, the test points on the PCBs are often small parts (e.g., a pad) having sizes, but are not pure points. Therefore, controlling the movements of the robotic arms based on the coordinate information recorded in the layout files of the PCBs may introduce measurement errors.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
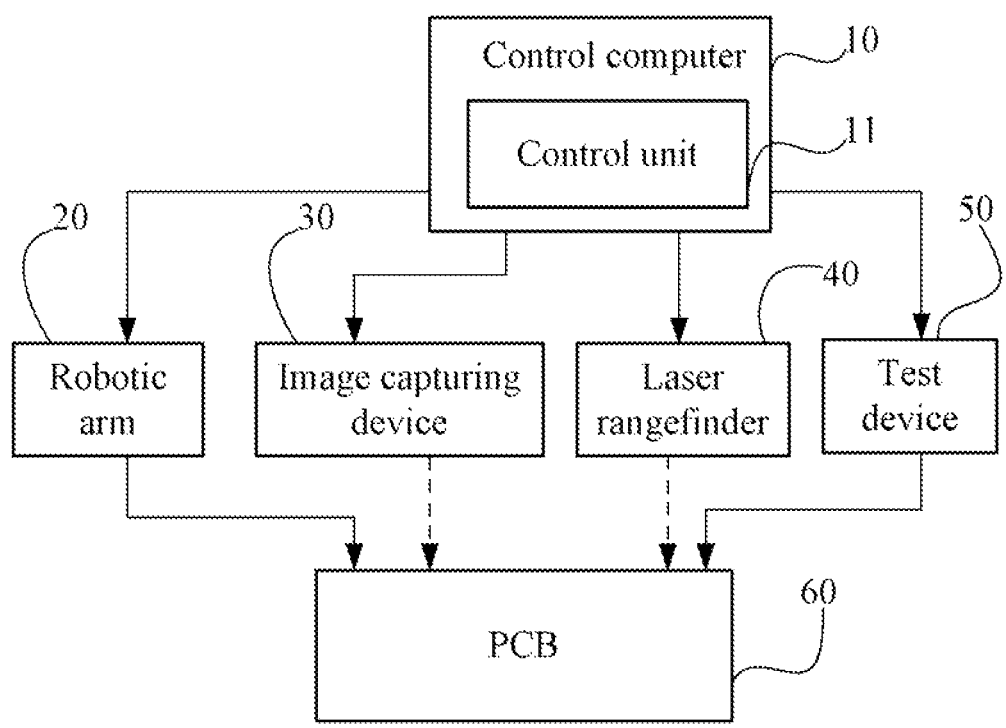
FIG. 1 is a block diagram of one embodiment of an application environment of a control computer for controlling a robotic arm.

FIG. 1 is a block diagram of one embodiment of an application environment of a control computer 10 for controlling movements of a robotic arm 20. The control computer 10 includes a control unit 11 and is electronically connected to the robotic arm 20, an image capturing device 30, a laser rangefinder 40, and a test device 50. In one embodiment, the image capturing device 30 may be a digital camera, and is installed directly above a printed circuit board (PCB) 60 being tested. The PCB 60 is placed on a horizontal platform. The test device 50 may be an oscillograph or a time domain reflectometer.

In one embodiment, the image capturing device 30 captures images of the PCB 60. The laser rangefinder 40 measures a distance from a probe of the test device 50 that is held by the robotic arm 20 to the PCB 60. The control unit 11 controls movements of the robotic arm along an X-axis and a Y-axis in a coordinate system of the robotic arm 20 based on two-dimensional (2D) coordinate information of test points on the PCB 60, and controls the movements based on image information of the PCB 60. Furthermore, the control unit 11 controls movements of the robotic arm 20 along a Z-axis in the coordinate system of the robotic arm 20 based on the measured distance, to precisely position the probe on a test point of the PCB 60.

During the movements of the robotic arm 20, the probe held by the robotic arm 20 is always located under the center of a lens of the image capturing device 30.

Figure 2:
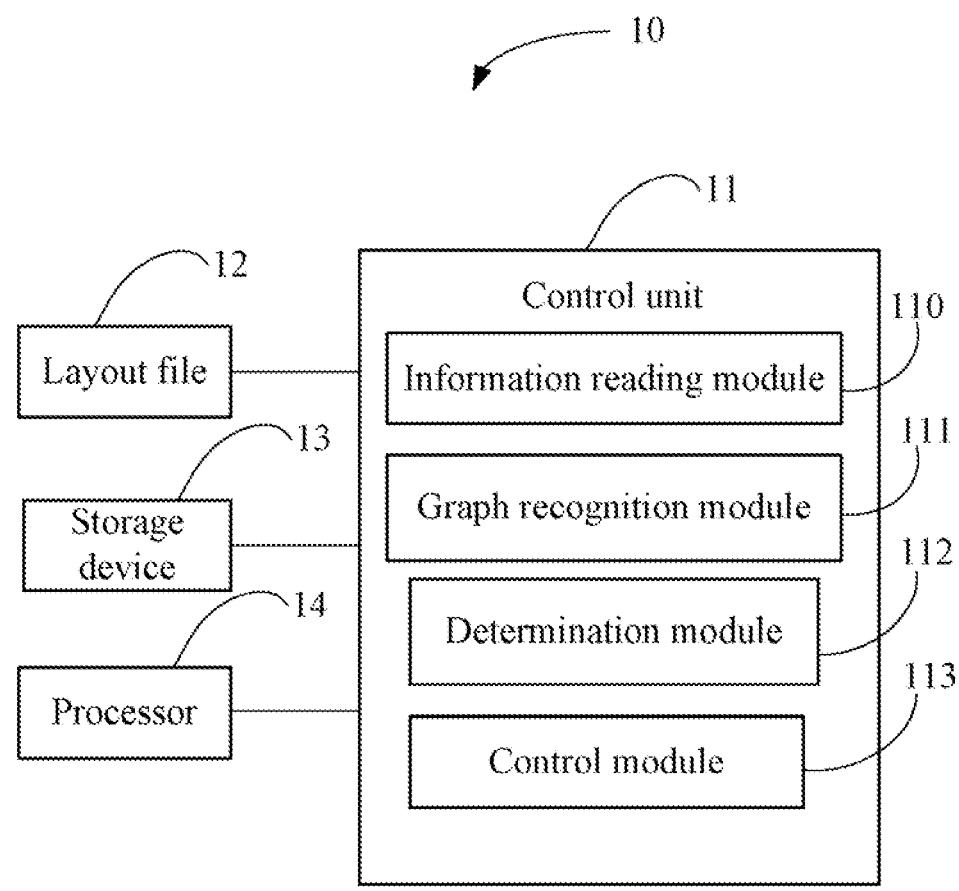
FIG. 2 is a block diagram of function modules of a control unit in the control computer of FIG. 1.

In one embodiment, as shown in FIG. 2, the control unit 11 includes a plurality of function modules, such as an information reading module 110, a graph recognition module 111, a determination module 112, and a control module 113. The modules 110-113 may comprise computerized-code in the form of one or more programs (computer-readable program code) that are stored in a storage device 13 of the control computer 10. The computerized code includes instructions that are executed by a processor 14 of the control computer 10 to provide the below described functions of the modules 110-113 illustrated in FIG. 3A and FIG. 3B.

Figure 3A:
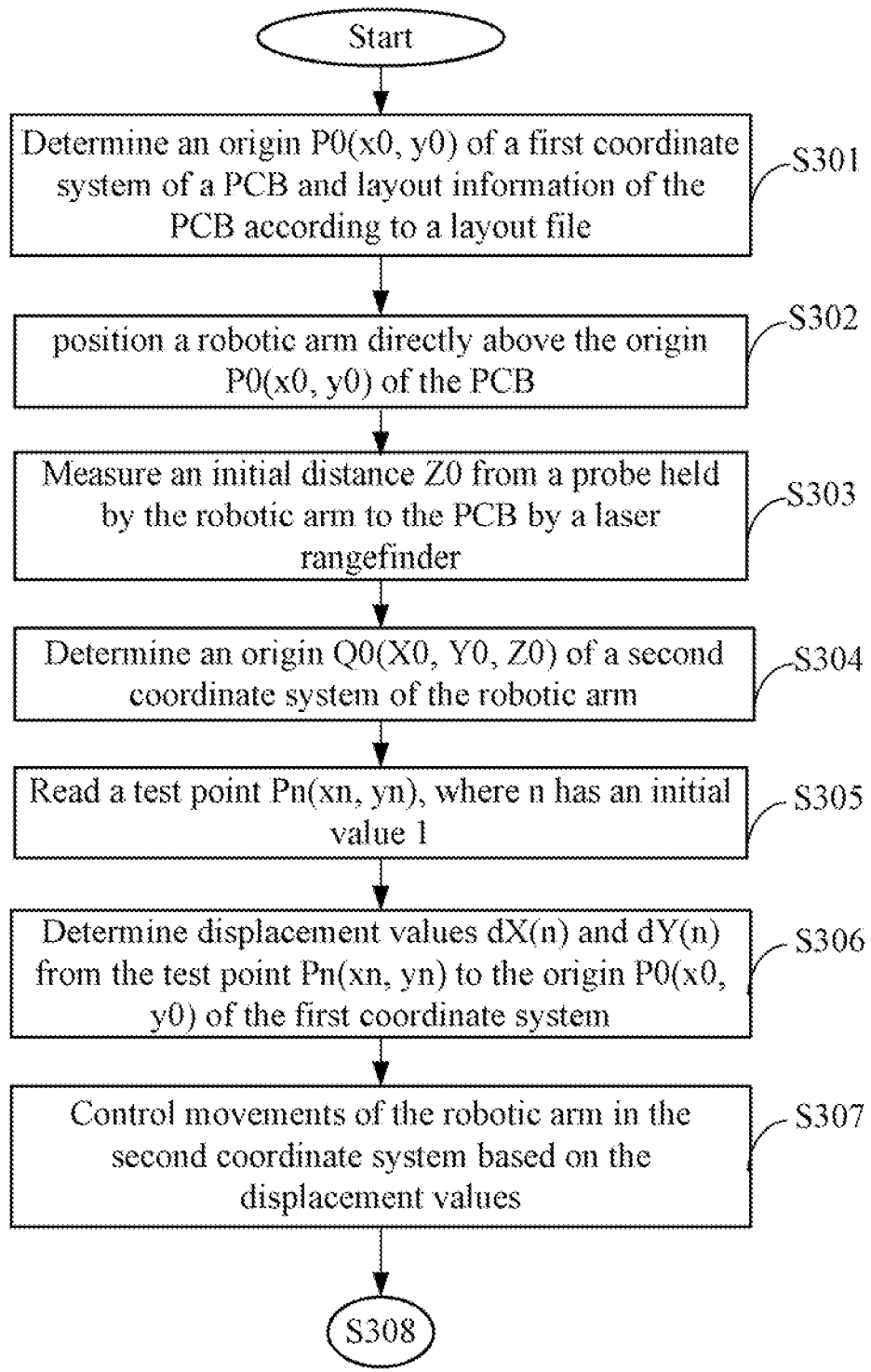
FIG. 3A and FIG. 3B are a block diagram of one embodiment of a method of controlling the robotic arm.
Figure 3B:
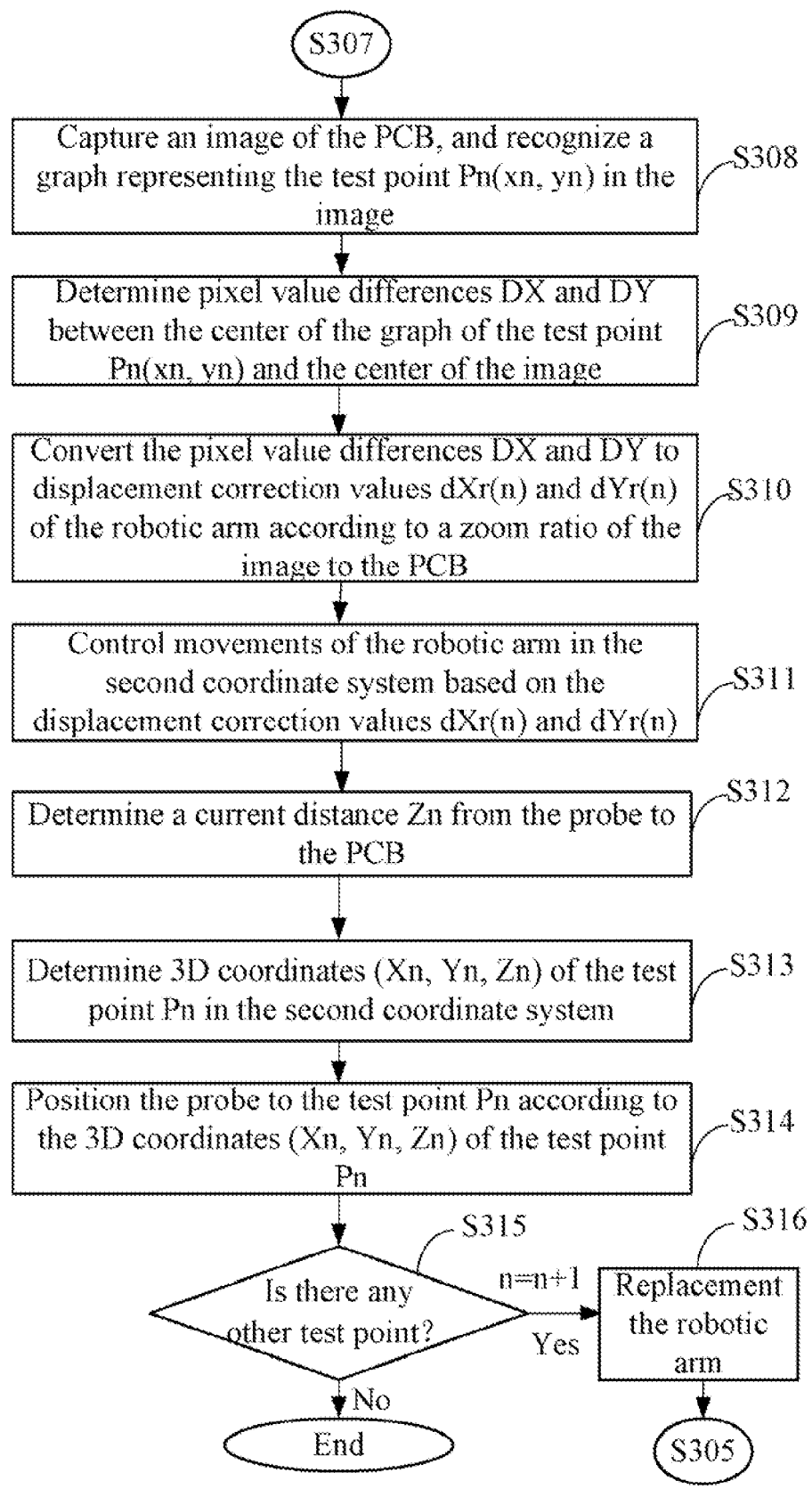

FIG. 3A and FIG. 3B give a flowchart of one embodiment of a method of controlling the robotic arm 20. Depending on the embodiment, additional blocks may be added, others removed, and the ordering of the blocks may be changed.

In block S301, the information reading module 110 reads a layout file 12 from the storage device 13, and determines an origin P0 of a coordinate system of the PCB 60 (hereinafter, referred to as the first coordinate system) according to layout information in the layout file 12. In one embodiment, the layout information includes two-dimensional (2D) coordinates (e.g., x0, y0) of the origin P0 of the first coordinate system, the number and types of components of the PCB 60, information as to the size of each component and the number of test points for each component, information as to the size of each test point and 2D coordinate information of each test point in the first coordinate system. The types of the components may include capacitors, inductors, resistors, and the like. For example, if a component or a test point has a circular shape, the size information may include a diameter or a radius, if a component or a test point has a rectangular shape, the size information may include a height and a width.

In block S302, the control module 113 generates a first control command to the robotic arm 20 to hold the probe and position the held probe directly above the origin P0(x0, y0) of the PCB 60.

In block S303, the laser rangefinder 40 measures an initial distance Z0 from the held probe to the PCB 60.

Figure 4:
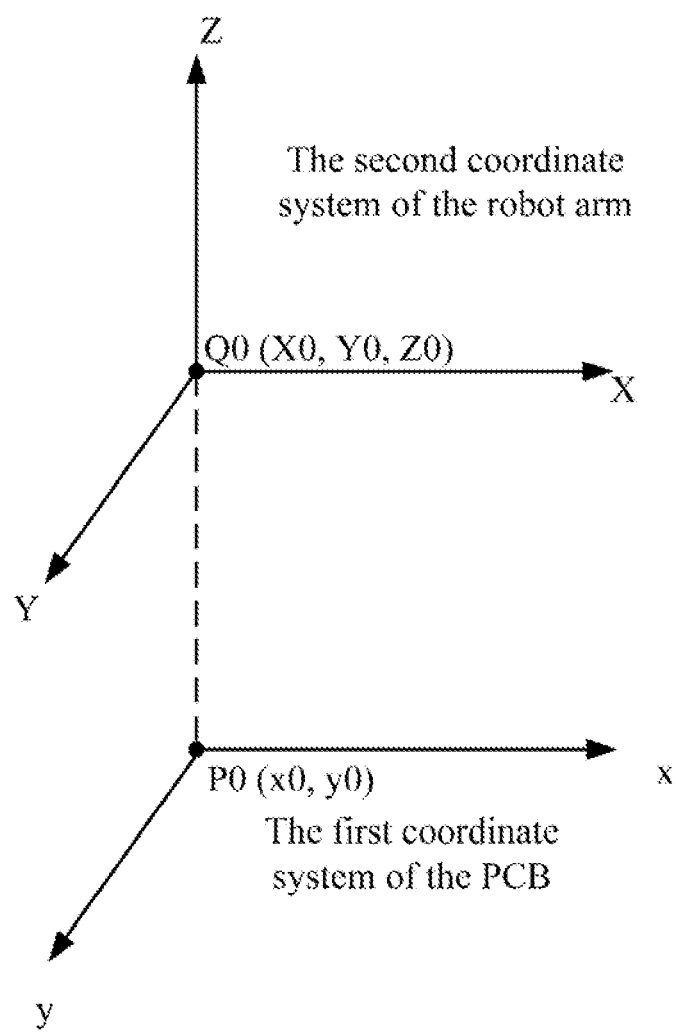
FIG. 4 gives an example illustrating relationship between a coordinate system of a printed circuit board (PCB) and a coordinate of a robotic arm.

In block S304, the determination module 112 determines an origin Q0(X0,Y0, Z0) of a coordinate system of the robotic arm 20 (hereinafter referred to as the second coordinate system) based on the origin Pn(x0, y0) of the first coordinate system and the initial distance Z0, where X0=x0, Y0=y0. For example, as shown in FIG. 4, the second coordinate system of the robotic arm 20 has the origin Q0(X0, Y0, Z0), an X-axis and a Y-axis that are respectively parallel to an x-axis, a y-axis of the first coordinate system of the PCB 60, and a Z-axis that is vertical to the first coordinate system of the PCB 60.

In block S305, the information reading module 110 reads coordinate information and the size information of a test point Pn(xn, yn) from the layout file 12, where n has an initial value of 1.

In block S306, the determination module 112 determines displacement values dX(n) and dY(n) from the test point Pn(xn, yn) to the origin P0(x0, y0) of the first coordinate system, where dX(n)=xn−x0, and dY(n)=yn−y0.

In block S307, the control module 113 generates a second control command to control movements of the robotic arm 20 in the second coordinate system according to the displacement values. For example, the robotic arm 20 moves along the X-axis direction by a distance of dX(n), and moves along the Y-axis direction by a distance of dY(n) in the second coordinate system.

In block S308, the image capturing device 30 captures an image of the PCB 60, the graph recognition module 111 recognizes the components and test points represented by the graphs in the image. For example, a graph representing the test point Pn(xn, yn) is recognized in the captured image.

In block S309, the determination module 112 determines pixel value differences DX and DY between the center of the graph of the test point Pn and the center of the image. For example, if the image has a resolution of 640 pixels×480 pixels, then the coordinate value of the center of the image is (320, 240). If a coordinate value of the test point Pn is (312, 234), then the pixel value difference DX between the center of the image and the center of the graph of the test point Pn along the X-axis direction is represented by the formula DX=320 pixels−312 pixels, and =8 pixels, and the pixel value difference DY between the center of the image and the center of the graph of the test point Pn along the Y-axis direction is represented by the formula DY=240 pixels−234 pixels, and =6 pixels.

In block S310, the determination module 112 converts the pixel value differences DX and DY to displacement correction values dXr(n) and dYr(n), to be applied to the robotic arm 20 according to the zoom ratio of the image to the actual PCB 60. For example, if the PCB 60 has a size of L cm×H cm, and the zoom ratio of the image to the PCB 60 is 1:2, then the dXr(n)=(8/640)*L/2, and the dYr(n)=(6/480)*H/2. The zoom ratio may be determined according to any enlargement ratio of the image capturing device 30.

In block S311, the control module 113 generates a third control command based on the displacement correction values dXr(n) and dYr(n), and controls the movements of the robotic arm 20 in the second coordinate system according to the third control command. For example, the robotic arm 20 moves further along the X-axis direction by a distance of dXr(n), and moves along the Y-axis direction by a distance of dYr(n), to position the probe directly above the center of the test point Pn(xn, yn).

In block S312, the laser rangefinder 40 measures a current distance Zn from the probe to the PCB 60.

In block S313, the determination module 112 determines three-dimensional (3D) coordinates (Xn, Yn, Zn) of the test point Pn in the second coordinate system according to the displacement correction values dXr(n) and dYr(n) and the current distance Zn from the probe to the PCB 60, where Xn=xn+dXr(n), and Yn=yn+dYr(n).

In block S314, the control module 114 generates a fourth control command to move the robotic arm 20 along the negative Z-axis direction by a distance of Zn, to precisely position the probe on the test point Pn(xn, yn) of the PCB 60 and to test the test point Pn(xn, yn) by means of the test device 50.

In block S315, the information reading module 110 determines if there is any test point that has not been tested based on the layout information in the layout file 12. If there is any test point that has not been tested, the control module 114 generates a fifth control command to the robotic arm 20, to position the probe above the origin Q0(X0, Y0, Z0) of the second coordinate system of the robotic arm 20, and then the procedure returns to block S305. The procedure ends after all test points of the PCB 60 have been tested.

Although certain inventive embodiments of the present disclosure have been specifically described, the present disclosure is not to be construed as limited thereto. Various changes or modifications may be made to the present disclosure without departing from the scope and spirit of the present disclosure.

What is claimed is:

1. A computer-based method of controlling a robotic arm being performed by execution of computer readable program code by a processor of a control computer, the method comprising:

executing, by the processor, the steps of:

(a) reading a layout file from a storage device, and determining an origin P0(x0, y0) of a first coordinate system of a printed circuit board (PCB) according to layout information in the layout file;

(b) generating a first control command to a robotic arm configured to hold a probe of a test device and position the held probe directly above the origin P0(x0, y0) of the first coordinate system;

(c) determining an origin Q0(X0, Y0, Z0) of a second coordinate system of the robotic arm based on the origin Pn(x0, y0) of the first coordinate system and an initial distance Z0 from the probe to the PCB;

(d) reading coordinate information and size information of a test point Pn(xn, yn) of the PCB from the layout file, wherein n has an initial value of 1, and determining displacement values dX(n) and dY(n) from the test point Pn(xn, yn) to the origin P0(x0, y0);

(e) generating a second control command configured to control movements of the robotic arm in the second coordinate system according to the displacement values;

(f) capturing an image of the PCB, recognizing the test point Pn(xn, yn) represented by a graph in the image based on the layout information;

(g) determining pixel value differences DX and DY between the center of the graph and the center of the image, and converting the pixel value differences DX and DY to displacement correction values dXr(n) and dYr(n) of the robotic arm according to a zoom ratio of the image to the PCB;

(h) generating a third control command configured to control the movements of the robotic arm in the second coordinate system according to the displacement correction values dXr(n) and dYr(n);

(i) determining three-dimensional (3D) coordinates (Xn, Yn, Zn) of the test point Pn(xn, yn) in the second coordinate system according to the displacement correction values dXr(n) and dYr(n) and a current distance Zn from the probe to the PCB, wherein Xn=xn+dXr(n), Yn=yn+dYr(n); and (j) generating a fourth control command configured to move the robotic arm along a negative Z-axis direction of the second coordinate system by a distance of Zn, to precisely position the probe on the test point Pn(xn, yn) of the PCB and test the test point Pn(xn, yn) by the test device.

2. The method of claim 1, further comprising:

determining if there is any test point that has not been tested based on the layout information in the layout file; and generating a fifth control command to the robotic arm to position the probe above the origin Q0(X0, Y0, Z0) of the second coordinate system on condition that there is any test point that has not been tested; and repeating from block (d) until all test points of the PCB have been tested.

3. The method of claim 1, wherein controlling the movements of the robotic arm in the second coordinate system in block (i) comprises: moving the robotic arm along the X-axis direction by a distance of dXr(n), and moving the robotic arm along the Y-axis direction by a distance of dYr(n).

4. The method of claim 1, wherein the pixel value differences DX and DY between the center of the graph and the center of the image is determined according to a resolution of the image and coordinates of the test point Pn(xn, yn).

5. The method of claim 1, wherein the image capturing device is installed directly above the PCB, and the probe held by the robotic arm is always located under the center of a lens of the image capturing device during the movements of the robotic arm.

6. The method of claim 1, wherein the layout information includes two-dimensional (2D) coordinates of the origin P0(x0, y0) of the first coordinate system, the number and types of components of the PCB, information as to the size of each component and the number of test points for each component, information as to the size of each test point and 2D coordinate information of each test point in the first coordinate system.

7. The method of claim 1, wherein the test device is an oscillograph or a time domain reflectometer.

8. The method of claim 1, wherein the initial distance Z0 and the current distance Zn are measured by a laser rangefinder.

9. A non-transitory computer-readable medium storing a set of instructions, the set of instructions capable of being executed by a processor of a control computer to perform a method of controlling a robotic arm, the method comprising:

(a) reading a layout file from a storage device, and determining an origin P0(x0, y0) of a first coordinate system of a printed circuit board (PCB) according to layout information in the layout file;

(b) generating a first control command to a robotic arm configured to hold a probe of a test device and position the held probe directly above the origin P0(x0, y0) of the first coordinate system;

(c) determining an origin Q0(X0, Y0, Z0) of a second coordinate system of the robotic arm based on the origin Pn(x0, y0) of the first coordinate system and an initial distance Z0 from the probe to the PCB;

(d) reading coordinate information and size information of a test point Pn(xn, yn) of the PCB from the layout file, wherein n has an initial value of 1, and determining displacement values dX(n) and dY(n) from the test point Pn(xn, yn) to the origin P0(x0, y0);

(e) generating a second control command configured to control movements of the robotic arm in the second coordinate system according to the displacement values;

(f) capturing an image of the PCB, recognizing the test point Pn(xn, yn) represented by a graph in the image based on the layout information;

(g) determining pixel value differences DX and DY between the center of the graph and the center of the image, and converting the pixel value differences DX and DY to displacement correction values dXr(n) and dYr(n) of the robotic arm according to a zoom ratio of the image to the PCB;

(h) generating a third control command configured to control the movements of the robotic arm in the second coordinate system according to the displacement correction values dXr(n) and dYr(n);

(i) determining three-dimensional (3D) coordinates (Xn, Yn, Zn) of the test point Pn (xn, yn) in the second coordinate system according to the displacement correction values dXr(n) and dYr(n) and a current distance Zn from the probe to the PCB, wherein Xn=xn+dXr(n), Yn=yn+dYr(n); and (j) generating a fourth control command configured to move the robotic arm along a negative Z-axis direction of the second coordinate system by a distance of Zn, to precisely position the probe on the test point Pn (xn, yn) of the PCB and test the test point Pn (xn, yn) by the test device.

10. The non-transitory computer-readable medium of claim 9, further comprising:

determining if there is any test point that has not been tested based on the layout information in the layout file; and generating a fifth control command to the robotic arm to position the probe above the origin Q0(X0, Y0, Z0) of the second coordinate system on condition that there is any test point that has not been tested; and repeating from block (d) until all test points of the PCB have been tested.

11. The non-transitory computer-readable medium of claim 9, wherein controlling the movements of the robotic arm in the second coordinate system in block (i) comprises:

moving the robotic arm along the X-axis direction by a distance of dXr(n), and moving the robotic arm along the Y-axis direction by a distance of dYr(n).

12. The non-transitory computer-readable medium method of claim 9, wherein the pixel value differences DX and DY between the center of the graph and the center of the image is determined according to a resolution of the image and coordinates of the test point Pn(xn, yn).

13. The non-transitory computer-readable medium method of claim 9, wherein the image capturing device is installed directly above the PCB, and the probe held by the robotic arm is always located under the center of a lens of the image capturing device during the movements of the robotic arm.

14. The non-transitory computer-readable medium method of claim 9, wherein the test device is an oscillograph or a time domain reflectometer.

15. A control computer being connected to a robotic arm, comprising:

a storage device;

a processor; and one or more programs that are stored in the storage device and are executed by the processor, the one or more programs comprising:

an information reading module operable to read a layout file from the storage device, and determine an origin P0(x0, y0) of a first coordinate system of a printed circuit board (PCB) according to layout information in the layout file;

a control module operable to generate a first control command to the robotic arm configured to hold a probe of a test device and position the held probe directly above the origin P0(x0, y0) of the first coordinate system;

a determination module operable to determine an origin Q0(X0, Y0, Z0) of a second coordinate system of the robotic arm based on the origin Pn(x0, y0) of the first coordinate system and an initial distance Z0 from the probe to the PCB, and determine displacement values dX(n) and dY(n) from a test point Pn(xn, yn) of the PCB to the origin P0(x0, y0), where n has an initial value of 1;

the control module further operable to generate a second control command to control movements of the robotic arm in the second coordinate system according to the displacement values;

a graph recognition module operable to recognize the test point Pn(xn, yn) represented by a graph in an image that is captured by an image capturing device based on the layout information;

the determination module is further operable to determine pixel value differences DX and DY between the center of the graph and the center of the image, and convert the pixel value differences DX and DY to displacement correction values dXr(n) and dYr(n) of the robotic arm according to a zoom ratio of the image to the PCB;

the control module is further operable to generate a third control command to control the movements of the robotic arm in the second coordinate according to the displacement correction values dXr(n) and dYr(n);

the determination module is operable to determine three-dimensional (3D) coordinates (Xn, Yn, Zn) of the test point Pn in the second coordinate system according to according to the displacement correction values dXr(n) and dYr(n) and a current distance Zn from the probe to the PCB; and the control module is further operable to generate a fourth control command to move the robotic arm along a negative Z-axis direction of the second coordinate system by a distance of Zn, to precisely position the probe on the test point Pn(xn, yn) of the PCB and test the test point Pn(xn, yn) by the test device.

16. The control computer of claim 15, wherein controlling the movements of the robotic arm in the second coordinate system comprises:

moving the robotic arm along the X-axis direction by a distance of dXr(n), and moving the robotic arm along the Y-axis direction by a distance of dYr(n).

17. The control computer of claim 15, wherein the initial distance Z0 and the current distance Zn are measured by a laser rangefinder.

18. The control computer of claim 15, wherein the image capturing device is installed directly above the PCB, and the probe held by the robotic arm is always located under the center of a lens of the image capturing device during the movements of the robotic arm.

19. The control computer of claim 15, wherein the pixel value differences DX and DY between the center of the graph and the center of the image is determined according to a resolution of the image and coordinates of the test point Pn.

20. The control computer of claim 15, wherein the layout information includes two-dimensional (2D) coordinates of the origin P0(x0, y0) of the first coordinate system, the number and types of components of the PCB, information as to the size of each component and the number of test points for each component, information as to the size of each test point and 2D coordinate information of each test point in the first coordinate system.

* * * * *